(12) United States Patent
Ribeiro et al.

(10) Patent No.: US 7,769,800 B2
(45) Date of Patent: Aug. 3, 2010

(54) INTEGRATION PROCESS AND PRODUCT FOR DIGITAL SYSTEMS

(75) Inventors: Leonardo Larsen Ribeiro, Rua Coronel Otoni Maciel, 500, Curitiba (BR) 80320-00; Inivaldo Luiz da Silva, Curitiba (BR)

(73) Assignee: Leonardo Larsen Ribeiro, Curitiba (BB)

( * ) Notice: Subject to any disclaimer, the term of this patent is extended or adjusted under 35 U.S.C. 154(b) by 731 days.

(21) Appl. No.: 11/569,637

(22) PCT Filed: Jun. 2, 2005

(86) PCT No.: PCT/IB2005/051809
§ 371 (c)(1),
(2), (4) Date: Mar. 29, 2007

(87) PCT Pub. No.: WO2005/119976
PCT Pub. Date: Dec. 15, 2005

(65) Prior Publication Data
US 2008/0222231 A1      Sep. 11, 2008

(30) Foreign Application Priority Data
Jun. 4, 2004    (BR) .................................. 0402190

(51) Int. Cl.
*G06F 15/16* (2006.01)
(52) U.S. Cl. ...................................... 709/200; 709/201
(58) Field of Classification Search ................. 709/200, 709/201
See application file for complete search history.

(56) References Cited

U.S. PATENT DOCUMENTS

| 6,453,356 | B1 | 9/2002 | Sheard et al. |
| 6,898,618 | B1* | 5/2005 | Slaughter et al. ............ 709/206 |
| 2003/0158883 | A1* | 8/2003 | Drudis et al. ............... 709/102 |
| 2003/0177160 | A1 | 9/2003 | Chiu et al. |
| 2003/0220968 | A1 | 11/2003 | Hickson et al. |

FOREIGN PATENT DOCUMENTS

WO    WO 02/39353 A1    5/2002

OTHER PUBLICATIONS

Wackerow, Dieter, MQSeries Primer, MQ EAI Center, Oct. 1999, 34 pages. www.ibm.com.
Chappel, David. Understanding BizTalk Server 2004, Feb. 2004, 33 pages. MSDN Library, msdn.microsoft.com.

* cited by examiner

*Primary Examiner*—Wing F Chan
*Assistant Examiner*—Andrew Woo
(74) *Attorney, Agent, or Firm*—Sughrue Mion, PLLC

(57) ABSTRACT

The present invention relates to a digital system integration process through a virtual server (5), which comprises a process that distributes instances of message management and processing application according to the number of processors (9) present in each server (10). A message reader component (2) removes the message from one of the input queues (1) and verifies if it is a valid message. Then the messages are stored in the internal processing queue (3) according to the environment configurations and the application server (4) marks the message with the respective virtual server (5). The application server (4) removes the message from the processing queue (3) and delivers the message to the client application (6). Finally, the message is validated and, after it is processed, excluded from the database (8).

2 Claims, 6 Drawing Sheets

INTEGRATION PROCESS AND PRODUCT FOR DIGITAL SYSTEMS

This application claims priority from PCT Application No. PCT/IB2005/051809, filed Jun. 2, 2005, and from Brazilian Application No. PI0402190-8, filed Jun. 4, 2004, which applications are incorporated herein by reference.

TECHNICAL FIELD

The present invention relates to data transfer by computers, by means of an integration process and resulting product that manages and processes electronic messages, using virtual servers to distribute the processing workload, aiming at various digital systems integration.

BACKGROUND ART

Nowadays, there are a plurality of different languages and protocols used by developers around the world for developing different applications. Even programs that look very similar to the user may treat data completely different when communicating to other applications. There are some standards but the variety of languages is necessary due to the diversification of situations in which they are used. Besides, when an application is being developed, it is impossible for the developer to foresee all the uses the application will have, therefore it is impossible that the application itself will be able to perform such integration with all the others applications that it will work with.

In this scenario, the integration between diverse applications is very important in order to achieve a stable and reliable solution. For example, most database are running on mainframes or similar high-end servers, and most applications run on low-end servers or even common computers, thus the component between them must be as reliable and stable as both of them.

However integration of digital systems from different manufacturers in a company is extremely difficult, due to the inherent features of each one of these systems. There is a significant aggravating circumstance regarding this integration in large corporate groups that need to operate together. Besides the quality, both speed and reliability in the integration of these systems are sought, such that they fully satisfy the desired objectives.

Information is exchanged between these different digital systems through electronic messages, whose volume has significantly increased in the last few years. This increase proportionally raises the probability of failures, either due to delay in processing, system unavailability or language incompatibility.

Several digital systems were developed with the aim of satisfactorily solving the mentioned problems, for example, US Patent Application Publication No. 2003/0177160 relates to scheduling multiple tasks running on multiple platforms by analysis and consideration of various factors and metrics, such as priority if execution, balancing the work load, balancing of resources, resource availability, time constraints, etc. through such expedients as task assignment. The purpose is to minimize processing execution time and client waiting time by efficiently distributing workload among operational computers, processors and other system resources. A database stores the relationship of real world server workload versus time, measured against various metrics and historical data, within an intermediate result used to simulate future demand. This simulation is then used to reconfigure the system to meet the demand, thereby providing higher degrees of self management and autonomy to the web site.

The well-known system in prior art is the Biztalk Server (Microsoft Corporation trademark), which is an integration server product that enables you to develop, deploy, and manage integrated business processes and Web services that basically consists in execution of a message receiving process, orchestration (processing based on business rules) and delivery of these messages to the respective fulfillment application, connected to an Intranet or Internet. One subsystem used is the host (instance), which enables distributing several system components among several computers connected in network allowing with the purpose of sharing the processing. Each host can comprise one or more channels and adapters for sending and/or receiving messages, orchestration modules and pipelines.

The MQSeries family is part of the collection of products from the "WebSphere Business Integration" (International Business Machines Corporation trademarks), which is middleware for commercial messaging and queuing that speeds implementation of distributed applications by simplifying application development and test on a variety of platforms. The MQSeries products enable sending and receiving data, as messages, between programs that are internal or external to the business. They handle the network interfaces, ensure that messages are not duplicated, handle communication protocols, distribute the workload dynamically between a physical network of servers using Secure Sockets Layer (SSL), manipulate the system reconstruction after the occurrence of any problem and facilitate the writing of portable programs.

DISCLOSURE OF INVENTION

Technical Problem

However the solutions provided by the prior art do not solve suitably many problems in the technical field of data transfer by computers. Even with the creation of asynchronous systems for message processing, self-management of processes and message distribution processing, the problems persist, caused mainly by the already mentioned increase in data flow in a physical server network and it remains vulnerable due to the architecture of the processes used.

For instance, the document US20030177160 describes a solution that is restricted only to the application of self-management in web servers, and cannot be applied to message processing for digital integration systems of multiple managements, which is the object of the present invention.

The system Biztalk Server enables only one specific host instance in each server, as well as does not have self-management functionality.

Although the MQSeries family contains self-management in the receiving and processing of messages, it is not done by a virtual server.

Despite above solutions provide certain functionality to the respective applications, they are not immune to failures and performance decrease due to the processing distribution structures being necessarily linked to the use of protocols and network services.

Technical Solution

To solve the related cited problems this invention discloses a digital system integration process through a virtual server, which allow the configuration of how many instances will be used by a server aiming the processing of the input queue.

Each instance works as an individual processor, avoiding troubles such as database block and thus increasing the process performance.

In order to provide this solution, the process is configured through an external data input, which indicate the number of instances that should be used for processing a certain message-processing queue in a certain server. The processing environment then creates instances of the application in the processors present in the servers according to the informed quantity and attributes a single identifier to each one.

ADVANTAGEOUS EFFECTS

The present invention discloses a framework for asynchronous application creation that provides a greater productivity and security to the solution development. Besides, the framework provides database development models that allow the construction of applications with high performance and integrity.

Additionally, the process application manages the message processing providing workload balancing and failure tolerance services. Further, it does not need tools, such as of distributed transactions, which besides decreasing the processing performance, increases the failure risk. In this way, the present invention guarantees the solution stability.

The workload balancing allows the message processing workload according to the system needs and enables configurations such as processing priority. And different configurations can be configured according to the situation or schedule.

Moreover, the process application can detect and adjust to most of configuration modifications without the need of being restarted.

In addition, this use of virtual servers in the treatment and processing of messages in a digital system integration process provides a significant increase in the volume of processed messages, resulting from the parallel functioning of the several instances of the message processor (virtual server). Besides, it increases the reliability during the entire message transaction, since more than one virtual server can process the same message processing queue (redundancy); and reduces the data flow in the server network, since the various virtual servers are in the same physical server and balancing of configurable workload, providing flexibility and reliability in message processing.

DESCRIPTION OF DRAWINGS

The object of the inventions becomes perfectly understood in the following description with references to the indicative numerals in accompanying drawings, evidencing its main characteristics, as follows.

MODE FOR INVENTION

Figure 1:
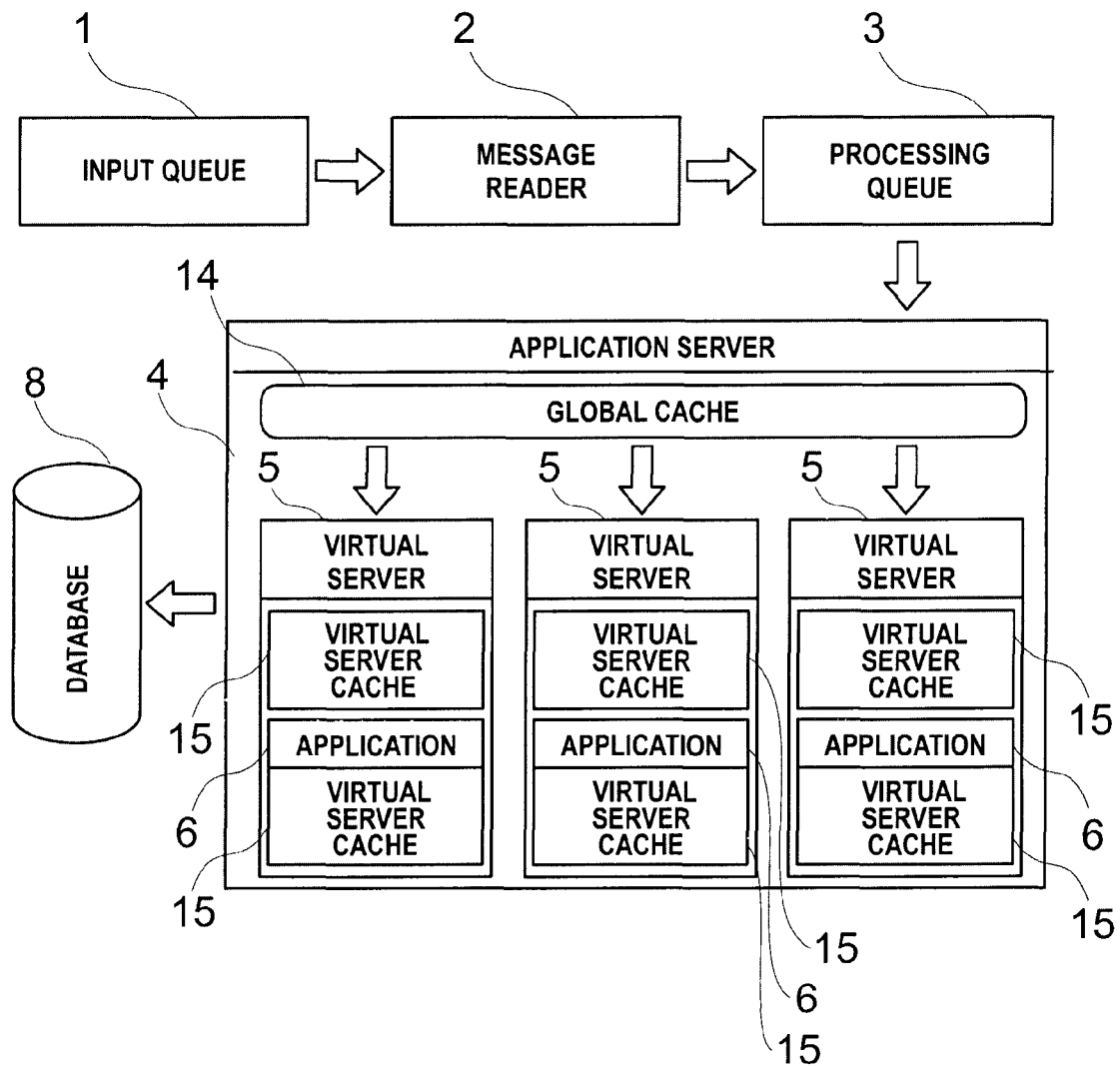
FIG. 1—Diagram showing the message processing, since the input queue to the processing by the virtual server.
Figure 2:
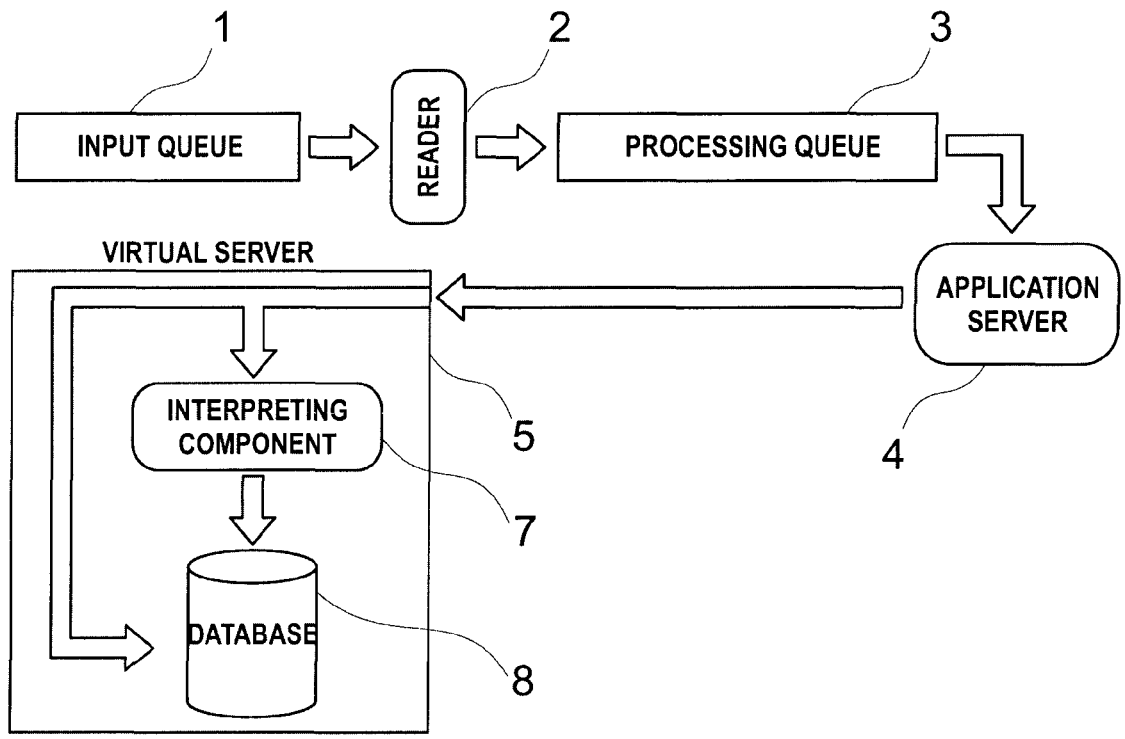
FIG. 2—Diagram showing the message processing, since the input queue to the interpreting component.
Figure 3:
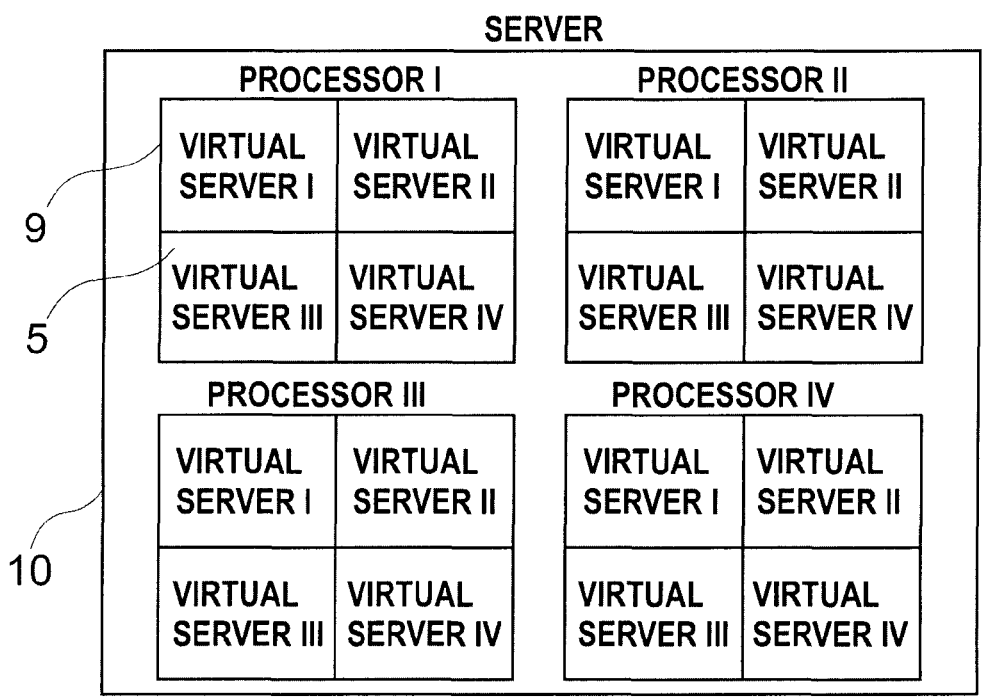
FIG. 3—Diagram exemplifying the distribution of virtual servers among the physical microprocessors that compose the server.

The digital system integration process removes the message from one of the input queues (1), for example MQSeries, WebService, File System, MSMQ, etc, through the message reader component (2) and verifies if it is a valid message. Then the messages are stored in the internal processing queue (3) according to the environment configurations. When the application server (4), which constantly monitors the processing queue (3), finds an available message, the message is marked, registering which virtual server (5) will process it, and is copied together with other information that might be relevant to the processing, finally, the application server (4) removes the message from the processing queue (3) and delivers the message to the client application (6). The client application (6) can call the interpreting component (7) to convert the message data that remains in the database (8). The interpreter (7) is capable of translating the information received from other external applications into something that can be interpreted by the system using the digital system integration process, and vice-versa. The application server (4), in a transaction in which the data persists, runs a procedure to exclude the already processed message and then another procedure to verify if this already processed message has really been excluded.

Due to the processing being based on message input queues (1), the necessary quantity of internal processing queues (3) can be created. Through the application server (4) configuration, it is possible to select which virtual servers (5) will process each one of these queues (3) and how many instances in the application should be created in each microprocessor (9) of these physical servers (10) to handle each queue (3). Each instance is treated as an individual processing server, which avoids problems such as database block. This processing distribution characterizes a form of load balancing. Next, the time interval is defined, in which these queues (3) should be consulted in search of messages for processing. The configuration of the application server (4) allows the configuration of different models to each situation or according to a schedule.

The environment may have failure tolerance if more than one virtual server (5) is configured to process the same message queue (3). Each virtual server (5) is responsible for informing, at predefined intervals, the processing status and check the status of other virtual servers (5) of the environment. If after two intervals, a virtual server (5) detects that another virtual server (5) did not update the respective status, the failure tolerance service running in the virtual server (5) that detected the problem will change the status of the virtual server (5) with problems to disable and will release the messages that were being processed in all the processing queues (3) registered for the virtual server (5) with problems for processing by. If any message was being processed by the virtual server (5) with problem, another virtual server (5) in the environment, that is configured to process the same queue (3), will process the message. The load balancing process, according to the defined configurations, undertakes to adjust the processing load between the remaining virtual servers (5).

Figure 4:
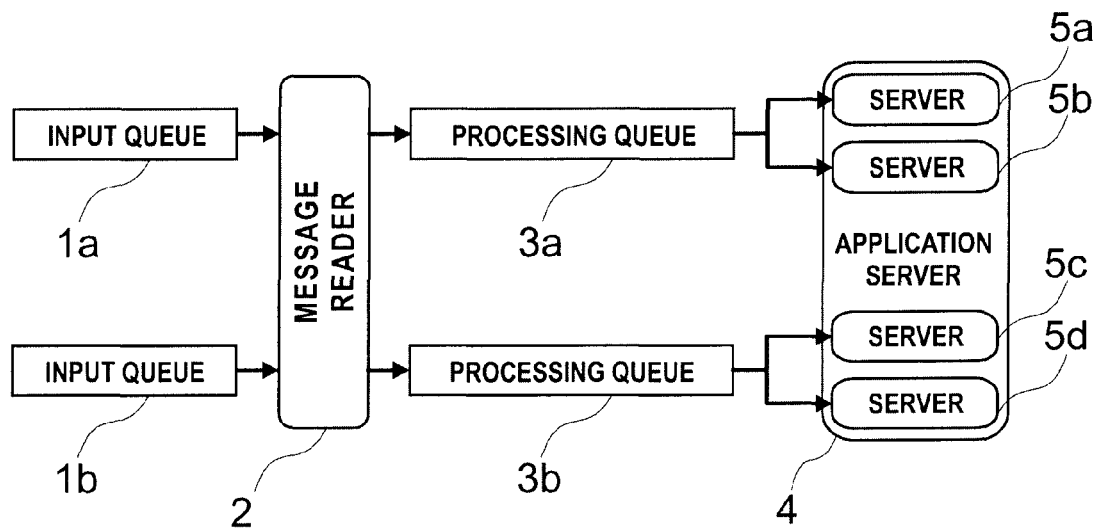
FIG. 4—Diagram exemplifying the processing distribution of processing queues among the various virtual servers through the processing environment, in which each processing queue is maintained by two servers.

FIG. 4 illustrates an exemplifier embodiment of the invention, in which there are four processing virtual servers (5a), (5b), (5c) and (5d) and the administrator defines two messages receiving queues (1a) and (1b) in the message manager. In this exemplifier embodiment, the administrator sets the message reader (2) to read the messages in the input queues and saves them in the respective processing queue (3a) or (3b). Further, the administrator sets the virtual servers (5a) and (5b) to process queue (3a), and sets the virtual servers (5c) and (5d) to process queue (3b), with the purpose to obtain failure tolerance.

Figure 5:
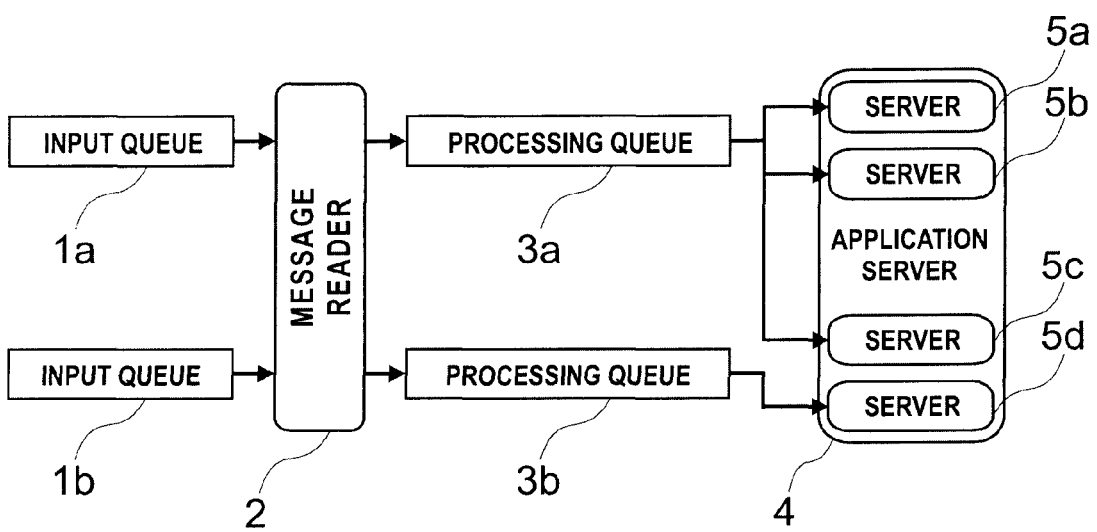
FIG. 5—Diagram exemplifying the processing distribution of the processing queues among the various virtual servers through the processing environment, in which one processing queue is maintained by three servers, and the other processing queue is maintained by one server.

In addition, FIG. 5 illustrates another exemplifier embodiment of the invention, in which there are four processing virtual servers (5a), (5b), (5c) and (5d). The administrator may set the application to, according to the schedule; change the virtual servers (5a), (5b) and (5c) to process queue (3a), and sets only virtual server (5d) to process queue (3b).

Moreover, the administrator could set the virtual server (5a) to process the queue (3a) with, for example, four instances per processor and to process the queue (3b) with, for example, one instance per processor.

Figure 6:
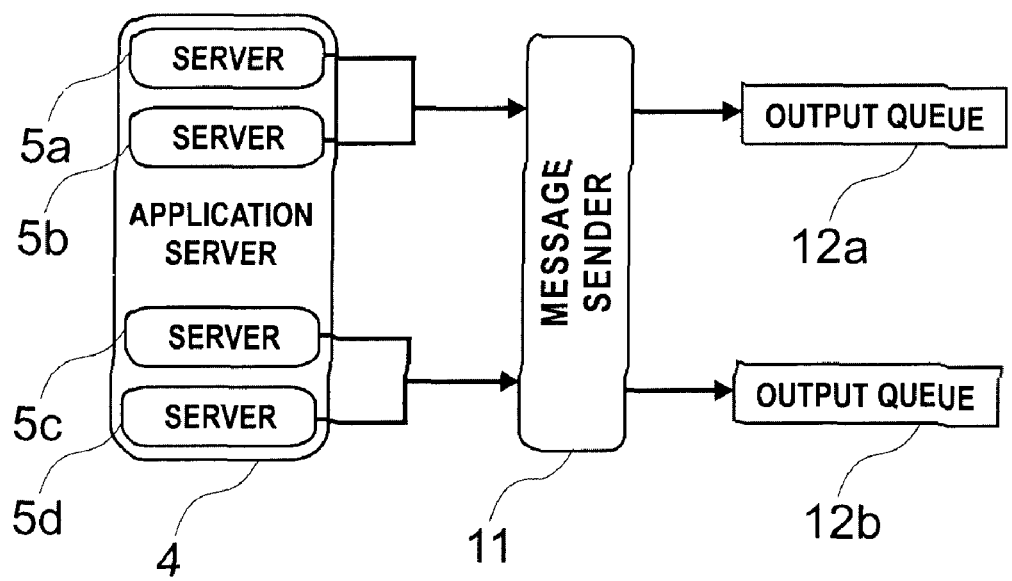
FIG. 6—Diagram showing the sending of messages from two virtual servers to the message sender connected to the output queues.
Figure 7:
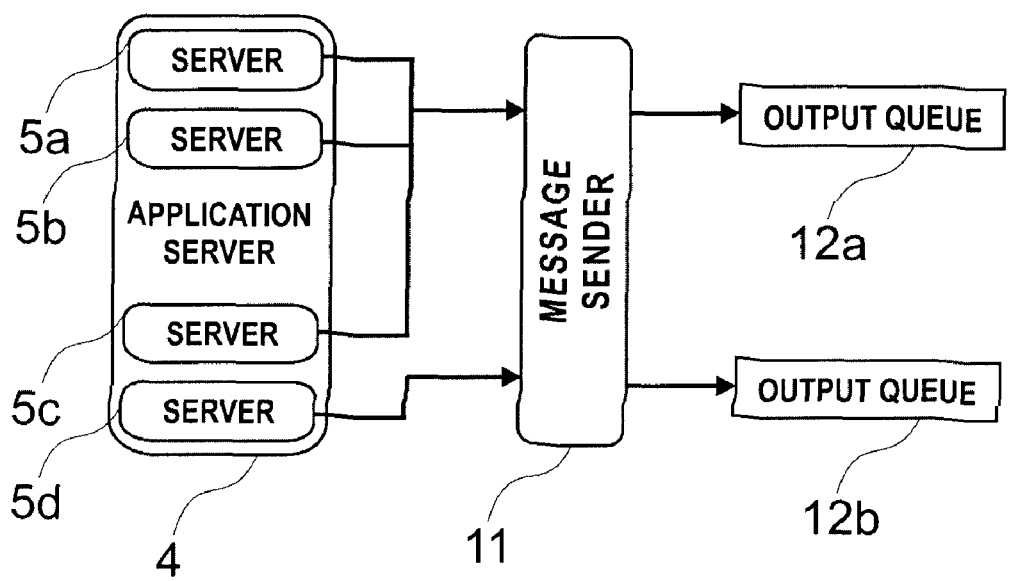
FIG. 7—Diagram exemplifying the sending of messages from three virtual servers to the message sender connected to the output queues.
Figure 8:
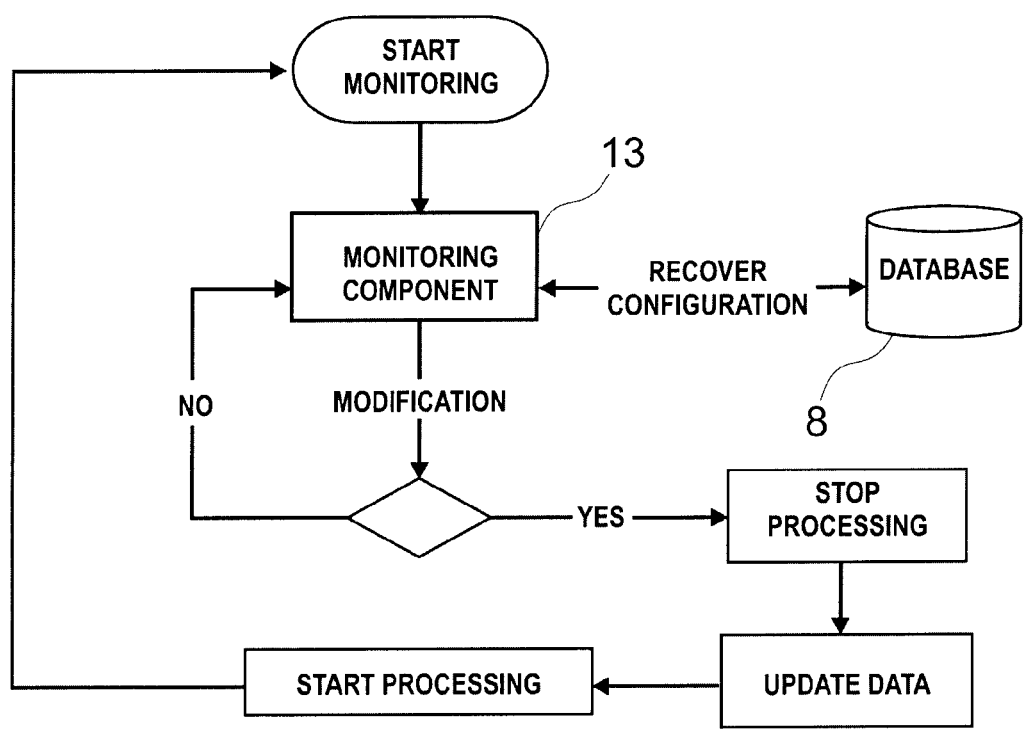
FIG. 8—Diagram indicating the operation of the monitoring component in hot configuration.
Figure 9:
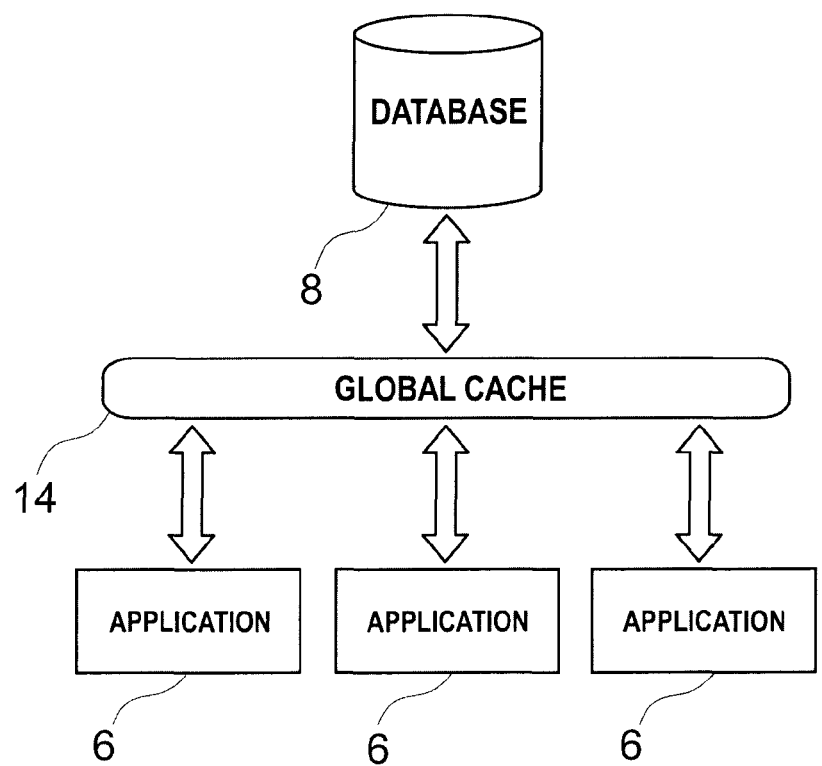
FIG. 9—Diagram showing the global cache component with the purpose of keeping the data synchronized in the application.
Figure 10:
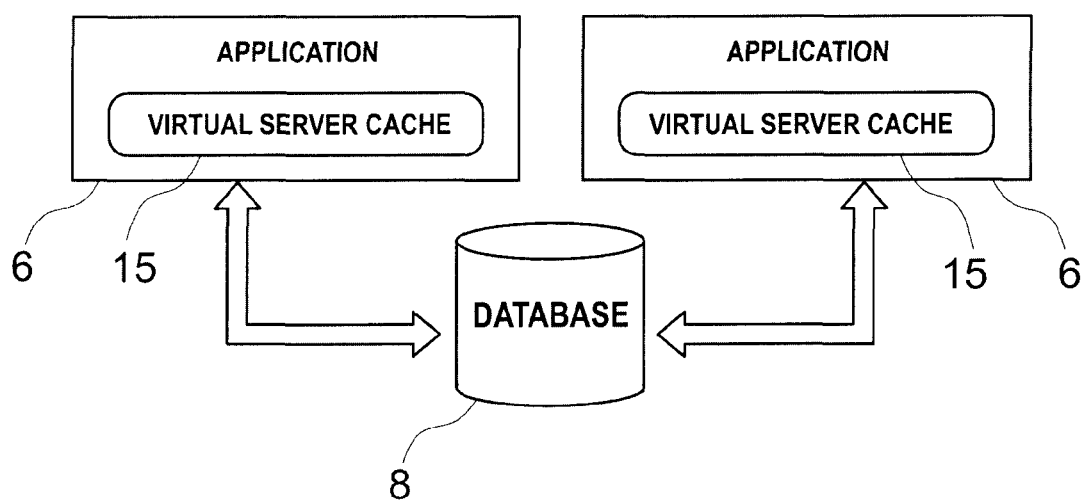
FIG. 10—Diagram showing the cache component of the virtual server with the purpose of personalizing copies of data in each instance of the application and making them independent of the existing database.

FIGS. 6 and 7 show other exemplifier embodiments, in which the administrator set the virtual servers (5a), (5b), (5c) and (5d) to send messages to the message sender component (11) that sends the messages to the output queue (12a) and (12b). According to the schedule configuration, the application server (4) changes from the configuration shown in FIG. 6 to the configuration shown in FIG. 7, for example.

The process of changing hot configurations provides the reading, processing and sending environment with the capacity to detect and adapt to the new configurations at any time without the need to restart them. On starting the services of the message reader component (2), of the message sending component (11) and of the application server (4), a data structure is loaded in the memory containing all information pertinent to the execution configuration. Based on this data, the services start their respective functions. A monitoring component (13) is created parallel to this process, which has the purpose of periodically verifying if there was any configuration change in the database (8). This identification is done on the occurrence of change in the value of a specific field in the respective configuration tables.

On detecting a change, this monitoring component (13) interrupts the reading, processing or sending, loads the updated data in the structure in memory and restarts the component whose configurations were changed. All this process occurs without the user's intervention.

The cache component, which can be used in two variations, global cache (14) or virtual server cache (15), is responsible for keeping in a virtual server (5) all data existing in the system database (8) which are frequently used in the message processing of the digital system integration process. In this way the cache guarantees that any modification made in the database (8) is immediately reflected in the application server (4). The data maintenance component in the application server (4) monitors this structure to know if there was any change that requires reloading of information. During the data actualization, the cache automatically stops the message processing until the reconfiguration is done. The application interface responsible for updating the information maintained in the cache should run a procedure, provided with the digital system integration, that will make available to the data maintenance component in the application server (4) the information that the data was updated. To process a determined message, the application needs to consult backup information, such as registers, and other information that enable validating the data, for instance. The information required for these procedures are researched in the implementation of the cache in the application servers (4) instead of the database (8).

The data maintenance process in the application servers (4) is permanently connected to the cache structures in the database (8), searching for changes in the data maintained in the cache. Whenever an inquiry is executed in the application server (4), the global cache (14) checks if the data maintenance component in the application server (4) is synchronized. Since the virtual server cache (15) is a copy of the data kept in the global cache (14) specific for an instance of the application, before the result of an inquiry is returned, verification is conducted to know if the data from the virtual server cache (15) is synchronized with the global cache (14). If not synchronized, the inquiry should only be made after synchronizing the data. No inquiry will have its result returned without verifying the synchronization status of the data kept.

In addition, this framework provides a set of security treatment components for the message exchange through a security manager that encrypts and decrypts the messages besides generating and verifying digital signatures.

INDUSTRIAL APPLICABILITY

The treatment and processing of messages in a digital system integration process on virtual servers disclosed in the present invention provides a significant increase in the volume of processed messages and in the reliability during the entire message transaction. In this manner, it is fully applicable to integration in large corporate groups that need to operate together and in which the reliability is indispensable, such as large banks.

Many tests have been implemented simulating time processing scenarios. The first scenario comprises a message being sent to input queue from a first system, then being made available by the reader to the processing according to the business rules configured. Once the processing is done, the message sender component sends the message to the output queue and, then, to an external entity.

The second scenario comprises an external entity sending a reply message, and the message being made available by the reader to the processing according to the business rules configured. Once the processing is done, the message sender component sends the message to the output queue and, then, to the first system.

The third scenario comprises a message being sent to input queue from an external entity, then being made available by the reader to the processing according to the business rules configured. Once the processing is done, the message sender component sends the message to the output queue and, then, to the first system.

Finally, the forth scenario is the simultaneous run of scenario 1 and scenario 2.

| Scenario | Quantity of messages | Mean Rate |
| --- | --- | --- |
| First | 30000 messages | 191.08 messages/s |
| Second | 30000 messages | 137.61 messages/s |

-continued

| Scenario | Quantity of messages | Mean Rate |
| --- | --- | --- |
| Third | 30000 messages | 183.37 messages/s |
| Forth | 60000 messages | 215.05 messages/s |

Even though the simulator has restricted capacity, the above results show that the bigger is the workload in the application, the faster will be the processing.

The invention claimed is:

1. An integration process for digital systems including a reader component, at least one virtual server configured in each of a plurality of microprocessors present in a physical server, and a sender component, the process comprising:
    an applications server which includes the virtual servers, the application server checking for available messages;
    the application server marking an available message, and registering a virtual server selected from among the virtual servers that will process the message according to the receiving order of the available messages and according to the workload balance of the virtual servers;
    the selected virtual server processing the message;
    the application server removing the message from the processing queue; and
    the application server delivering the message to a client application;
    wherein while the selected virtual server is processing said message, the application server continuously checks for a new message and another virtual server is chosen to process the received new message;
    the process further including a interpreting component providing at least one of data validation and conversion;
    wherein the application server includes a global cache and each of the virtual servers include a virtual server cache which loads in the memory a data structure containing the information pertinent to the execution configuration; and a monitoring component which periodically checks a database for any change in configuration, by means of a value entered in a specific field of the respective configuration tables; and
    wherein in response to a determination by the monitoring that a configuration has changed, the monitoring component
        interrupts reading, processing, or sending of data;
        loads updated data in the data structure in memory; and
        restarts the component or components whose configurations were changed.

2. A system for integration processing of digital systems, the system comprising:
    a message reader component receiving messages from a plurality of input message queues and outputting a plurality of message processing queues corresponding to the plurality of input message queues;
    an application server checking for available messages in the plurality of message processing queues, the application server including a plurality of physical microprocessors and a plurality of virtual servers, each physical microprocessor including at least one virtual server of the plurality of virtual servers,
    wherein the application server registers a virtual server from among the plurality of virtual servers that will process a particular message according to the receiving order of the particular message among the available messages and according to the workload balance of the virtual servers,
    wherein a first message processing queue is processed by a plurality of the virtual servers, and
    wherein the plurality of the virtual servers processing the first message processing queue include a first and second virtual servers, wherein the first virtual server checks a message processing status of the second virtual server, and if it is determined that the second virtual server did not update a message processing status thereof within a predetermined timer interval, the first virtual server releases the messages under processing by the second virtual server.

* * * * *